US012799767B2

(12) United States Patent
Chen

(10) Patent No.: US 12,799,767 B2
(45) Date of Patent: Nov. 17, 2026

(54) STORAGE AWNING

(71) Applicant: SOPHIA & WILLIAM BRANDS CO. LTD, Nanjing (CN)

(72) Inventor: Meidi Chen, Nanjing (CN)

(73) Assignee: SOPHIA & WILLIAM BRANDS CO. LTD, Nanjing (CN)

( * ) Notice: Subject to any disclaimer, the term of this patent is extended or adjusted under 35 U.S.C. 154(b) by 251 days.

(21) Appl. No.: 18/891,791

(22) Filed: Sep. 20, 2024

(65) Prior Publication Data

US 2026/0085542 A1 Mar. 26, 2026

(51) Int. Cl.

| | |
|---|---|
| ***E04H 15/14*** | (2006.01) |
| ***E04H 6/02*** | (2006.01) |
| ***E04H 15/16*** | (2006.01) |
| ***E04H 15/18*** | (2006.01) |
| ***E04H 15/36*** | (2006.01) |
| ***E04H 15/58*** | (2006.01) |

(52) U.S. Cl.

CPC ............. *E04H 15/14* (2013.01); *E04H 6/025* (2013.01); *E04H 15/16* (2013.01); *E04H 15/18* (2013.01); *E04H 15/36* (2013.01); *E04H 15/58* (2013.01); *Y02A 40/25* (2018.01)

(58) Field of Classification Search

CPC ......... E04H 15/14; E04H 6/025; E04H 15/16; E04H 15/18; E04H 15/36; E04H 15/58

USPC .............. 135/93, 94, 97, 117, 123, 124, 158

See application file for complete search history.

(56) References Cited

U.S. PATENT DOCUMENTS

| | | | | | |
|---|---|---|---|---|---|
| 7,963,295 | B2 * | 6/2011 | Li | E04H 15/32 135/120.2 |
| 9,303,426 | B2 * | 4/2016 | Workman | E04H 15/44 |
| D1,128,828 | S * | 6/2026 | Chen | D21/834 |
| 2004/0035454 | A1 * | 2/2004 | Tseng | E04H 15/16 135/121 |
| 2007/0039247 | A1 * | 2/2007 | Greenfeld | E04H 6/04 52/2.25 |
| 2012/0090455 | A1 * | 4/2012 | Duncan | E04H 9/10 156/60 |
| 2017/0284117 | A1 * | 10/2017 | Volin | E04H 15/46 |
| 2024/0309673 | A1 * | 9/2024 | van Lierop | A01G 22/00 |

(Continued)

FOREIGN PATENT DOCUMENTS

| | | | | |
|---|---|---|---|---|
| CN | 206667905 U | * | 11/2017 | |
| CN | 210659493 U | | 6/2020 | |
| CN | 111502349 A | * | 8/2020 | E04H 3/00 |

(Continued)

*Primary Examiner* — Robert Canfield

(74) *Attorney, Agent, or Firm* — Nitin Kaushik

(57) ABSTRACT

The present application provides a storage awning and belongs to the technical field of awnings. The awning includes an awning bracket and a sunshade cloth, where the awning bracket includes a plurality of arch-shaped support frames, a top rod, a side support rod, and a low rod are connected between two adjacent arch-shaped support frames, a same iron cable is connected between oblique arms of the two adjacent arch-shaped support frames, a partitioning band is connected to an inner wall of one of the arch-shaped support frames, and the sunshade cloth is sleeved on the plurality of arch-shaped support frames. An awning body is internally provided with a partitioning band, so that the awning body may be internally partitioned into a first space and a second space.

10 Claims, 10 Drawing Sheets

(56) References Cited

U.S. PATENT DOCUMENTS

| | | | | |
|---|---|---|---|---|
| 2025/0270841 | A1* | 8/2025 | Williams | E04H 15/20 |
| 2026/0201725 | A1* | 7/2026 | King | E04H 15/20 |

FOREIGN PATENT DOCUMENTS

| | | | | | |
|---|---|---|---|---|---|
| CN | 109788734 | B | * | 3/2022 | A01G 9/24 |
| CN | 217969354 | U | | 12/2022 | |
| CN | 220377687 | U | | 1/2024 | |
| JP | 2014198035 | A | * | 10/2014 | |

* cited by examiner

STORAGE AWNING

TECHNICAL FIELD

The present application relates to the field of awnings, and specifically, to a storage awning.

BACKGROUND

An awning is a frame for shielding direct sunlight, and an awning frame may be used for many outdoor occasions, such as a beach, a seaside, a door guard, or a parking spot. The awning is mainly composed of a bracket and a sunshade cloth covering the bracket, and an existing awning has a single function. After a vehicle is parked in the awning, an internal space of the awning is reduced, so that it is inconvenient for a person to enter the awning for cooling, and meanwhile, the interior of the awning is in a natural cooling state, so that the awning has a poor cooling effect and only plays a role of sunlight shielding. In addition, when a vehicle and an article are placed in a same sunshade cloth, the vehicle and the article collide easily. Therefore, a storage awning is provided.

SUMMARY

To make up for the above deficiencies, the present application provides a storage awning, to improve a problem of a single function of an existing awning.

Embodiments of the present application provide a storage awning, including an awning bracket and a sunshade cloth, where the awning bracket includes a plurality of arch-shaped support frames, a top rod, a side support rod, and a low rod are connected between two adjacent arch-shaped support frames, a same iron cable is connected between oblique arms of the two adjacent arch-shaped support frames, and a partitioning band is connected to an inner wall of one of the arch-shaped support frames; and the sunshade cloth is sleeved on the plurality of arch-shaped support frames, each of left and side walls of the sunshade cloth is provided with an entrance-exit opening, the partitioning band internally partitions the sunshade cloth into a first space and a second space, the partitioning band is provided with a door body, the partitioning band is further provided with a penetration opening, and a reflective strip is mounted on each of side walls of two left and right sides of the sunshade cloth.

In a specific implementation, a first winding door is fixedly connected to each of the left and right side walls of the sunshade cloth, two first winding doors are respectively located above two entrance-exit openings, each of front and rear surfaces of the first space and the second space is provided with a window, and a second winding door is mounted on each of a plurality of windows.

In a specific implementation, a back surface of the sunshade cloth is provided with a side opening, a third winding door is mounted on the back surface of the sunshade cloth, and the third winding door is located above the side opening.

In a specific implementation, a same reinforcing rod is connected between two oblique arms of the arch-shaped support frame, the iron cable includes an adjustable pulling lock, a rope is connected to each of two ends of the adjustable pulling lock, and two ropes are connected to the two adjacent arch-shaped support frames.

In a specific implementation, a same U-shaped rod is threadedly connected to bottom portions of two top rods, a fan assembly is slidably sleeved on the U-shaped rod, and the fan assembly is directly opposite to the penetration opening and can pass through the penetration opening.

In a specific implementation, the fan assembly includes a sleeve tube slidably sleeved on the U-shaped rod, a screw rod is fixedly connected to a bottom portion of the sleeve tube, a threaded tube is threadedly sleeved on the screw rod, an air blowing mechanism is fixedly connected to a bottom portion of the threaded tube, an abutting rod further threadedly penetrates through the sleeve tube, and one end of the abutting rod can abut against an outer wall of the U-shaped rod.

In a specific implementation, the air blowing mechanism includes a first cover body fixedly connected to the bottom portion of the threaded tube, a fixing plate is fixedly mounted on an inner wall of the first cover body, a first rotating shaft rotatably penetrates through the fixing plate, a first fan blade is fixedly mounted on a bottom portion of the first rotating shaft, a first bevel gear is fixedly mounted on a top portion of the first rotating shaft, and the first fan blade is located in the first cover body.

In a specific implementation, the air blowing mechanism further includes a motor mounted on an outer wall of the first cover body and a second rotating shaft rotatably penetrating through the first cover body, a first belt pulley is fixedly sleeved on a driving shaft of the motor, a second belt pulley is fixedly sleeved on the second rotating shaft, a same transmission belt is wound around the first belt pulley and the second belt pulley, a second bevel gear is fixedly sleeved on the second rotating shaft, and the first bevel gear is engaged with the second bevel gear.

In a specific implementation, two second cover bodies are fixedly connected to the outer wall of the first cover body, two ends of the second rotating shaft respectively extend into the two second cover bodies, a second fan blade is mounted at each of the two ends of the second rotating shaft, the second fan blade is located in the second cover body, and each of bottom portions of the two second cover bodies is provided with an air outlet.

In a specific implementation, a top portion of the first cover body is disposed in a tapered shape, a tapered surface of the first cover body is provided with a plurality of first air inlets, one end of the second cover body is disposed in a tapered shape, and a tapered surface of the second cover body is provided with a plurality of second air inlets.

Beneficial effects of the present application are as follows:

1. An awning body is internally provided with the partitioning band, so that the awning body may be internally partitioned into the first space and the second space. A vehicle and another tool or article may be stored in the first space, and a person may enter the second space for cooling, or an article may be placed in the second space. Meanwhile, each of the left and right side walls of the sunshade cloth is provided with the entrance-exit opening, to facilitate the vehicle and the person entering the sunshade cloth, and the back surface of the second space is additionally provided with the side opening, so that an entrance-exit channel of the second space is increased, to facilitate use. In addition, each of the front and rear surfaces of the first space and the second space is provided with the window, to implement internal ventilation of the first space and the second space, and the partitioning band is provided with the door body, so that the first space and the second space can be communicated, thereby facilitating entering the second space from the first space.

2. The U-shaped rod is mounted on the top portion of the bracket, the sleeve tube is slidably sleeved on the U-shaped rod, and the screw rod is mounted on the bottom portion of the sleeve tube, so that the threaded tube is sleeved on the screw rod, and the air blowing mechanism is mounted on the bottom portion of the threaded tube, thereby facilitating mounting the air blowing mechanism to the top portion of the bracket, to blow air downward. Meanwhile, the air blowing mechanism is pushed, so that the air blowing mechanism can move on the U-shaped rod, thereby adjusting a position of the air blowing mechanism, and the air blowing mechanism can move in the first space and the second space, thereby facilitating use.

BRIEF DESCRIPTION OF THE DRAWINGS

To describe the technical solutions in the embodiments of the present application more clearly, the following briefly describes the accompanying drawings required for describing the embodiments. It should be understood that, the following accompanying drawings show merely some embodiments of the present application, and therefore should not be regarded as a limitation on the scope. Those of ordinary skill in the art may still derive other related drawings according to these accompanying drawings without creative efforts.

Figure 1:
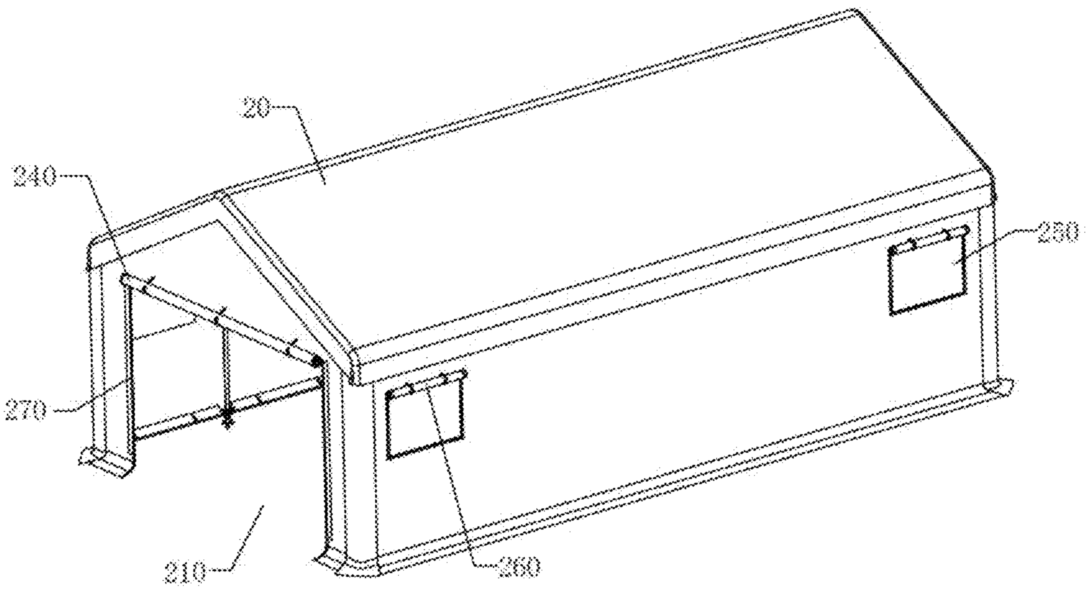
FIG. 1 is a schematic structural diagram of an awning from a first view according to an embodiment of the present application.

Reference numerals in the accompanying drawings: 10: awning bracket; 110: arch-shaped support frame; 1110: first support rod; 1120: sleeve ring; 1130: low rod connecting member; 1140: foot base; 1150: second support rod; 120: top rod; 130: side support rod; 140: low rod; 150: iron cable; 1510: adjustable pulling lock; 1520: rope; 160: partitioning band; 170: door body; 180: penetration opening; 20: sunshade cloth; 210: entrance-exit opening; 220: first space; 230: second space; 240: first winding door; 250: window; 260: second winding door; 270: reflective strip; 30: side opening; 40: third winding door; 50: reinforcing rod; 60: fan assembly; 610: sleeve tube; 620: screw rod; 630: threaded tube; 640: abutting rod; 70: U-shaped rod; 80: air blowing mechanism; 810: first cover body; 820: fixing plate; 830: first rotating shaft; 8310: first bevel gear; 840: first fan blade; 850: motor; 860: second rotating shaft; 8610: second bevel gear; 870: first belt pulley; 880: second belt pulley; 890: transmission belt; 90: second cover body; 910: second fan blade; 920: air outlet; 100: first air inlet; 200: second air inlet; 300: connecting rope; 400: three-way connecting member.

DETAILED DESCRIPTION OF THE EMBODIMENTS

The following describes the technical solutions in the embodiments of the present application with reference to the accompanying drawings in the embodiments of the present application.

Referring to FIG. 1 to FIG. 10, the present application provides a storage awning, including an awning bracket 10 and a sunshade cloth 20.

The awning bracket 10 includes a plurality of arch-shaped support frames 110, a top rod 120, a side support rod 130, and a low rod 140 are connected between two adjacent arch-shaped support frames 110, a same iron cable 150 is connected between oblique arms of the two adjacent arch-shaped support frames 110, and a partitioning band 160 is connected to an inner wall of one of the arch-shaped support frames 110. The sunshade cloth 20 is sleeved on the plurality of arch-shaped support frames 110, each of left and side walls of the sunshade cloth is provided with an entrance-exit opening 210, the partitioning band 160 internally partitions the sunshade cloth 20 into a first space 220 and a second space 230, the partitioning band is provided with a door body 170, the partitioning band 160 is further provided with a penetration opening 180, and a reflective strip 270 is mounted on each of side walls of two left and right sides of the sunshade cloth 20. Specifically, a volume of the first space 220 is greater than a volume of the second space 230, so that a vehicle or a large article may be parked in the first space 220, and a person may enter the second space 230 for cooling. The first space 220 and the second space 230 are separated through the partitioning band 160 in the middle, and the partitioning band 160 is further provided with the door body 170, to facilitate entering the first space 220 from the second space 230, and vice versa. The door body 170 is disposed on the partitioning band 160 through a zipper structure, the entrance-exit opening 210 is used for the article or the person to enter the sunshade cloth 20, and the reflective strip 270 facilitates parking at night.

Further, the top rod 120, the side support rod 130, and the low rod 140 are all configured to support the sunshade cloth 20, and the iron cable 150 on the arch-shaped support frame 110 is also configured to support the sunshade cloth 20. It should be noted that, a plurality of connecting ropes 300 pass through the sunshade cloth 20, thereby tying the connecting ropes 300 to corresponding arch-shaped support frames 110, to fix the sunshade cloth 20 to the awning bracket 10. Specifically, the iron cable 150 is disposed on each of oblique arms on two sides of the arch-shaped support frame 110. In addition, referring to FIG. 9, an arch-shaped support frame 110 on an outermost side is connected to the side support rod 130 through a three-way connecting member.

Figure 2:
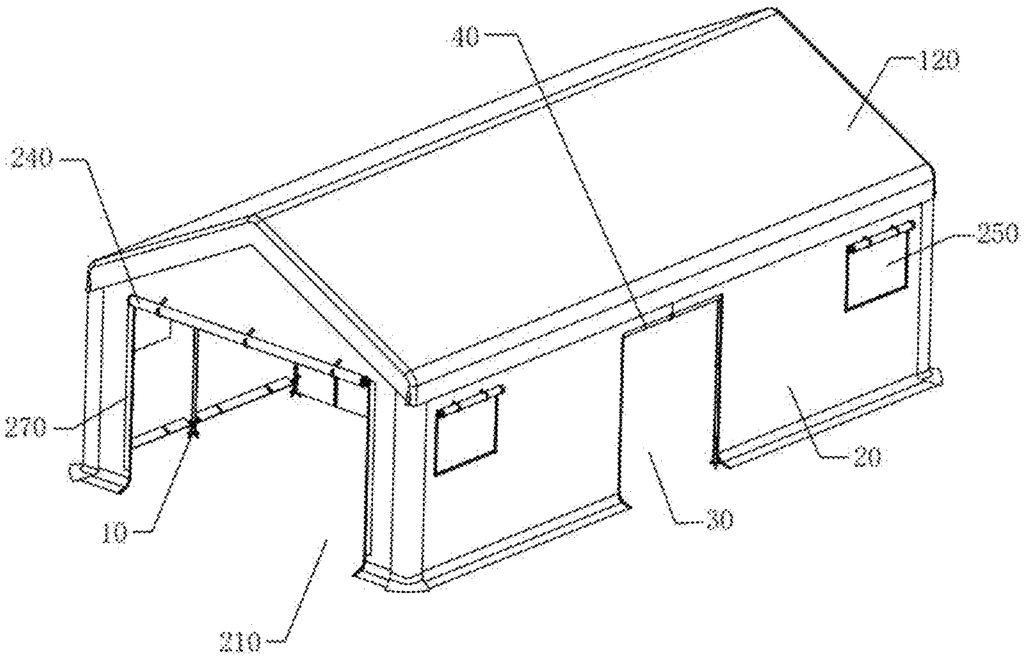
FIG. 2 is a schematic structural diagram of an awning from a second view according to an embodiment of the present application.

Referring to FIG. 1 and FIG. 2, a first winding door 240 is fixedly connected to each of the left and right side walls of the sunshade cloth 20, two first winding doors 240 are respectively located above two entrance-exit openings 210, each of front and rear surfaces of the first space 220 and the second space 230 is provided with a window 250, and a second winding door 260 is mounted on each of a plurality of windows 250. During disposing, pins are disposed on bottom portions of the plurality of arch-shaped support frames 110, to facilitate inserting the pins into the ground, thereby fixing the awning bracket 10. The sunshade cloth 20 is provided with the window 250, to implement internal ventilation of the sunshade cloth 20.

Referring to FIG. 1 and FIG. 2, a back surface of the sunshade cloth 20 is provided with a side opening 30, a third winding door 40 is mounted on the back surface of the sunshade cloth, and the third winding door 40 is located above the side opening 30. It should be noted that, a connecting band is disposed above each of the first winding door 240 and the second winding door 260, and the connecting band is fixedly connected to the sunshade cloth 20, and meanwhile, a connecting band is also disposed on each of the first winding door 240 and the second winding door 260, so that after the first winding door 240 and the second winding door 260 are wound upward, the two connecting bands are tied together, thereby fixing the first winding door 240 or the second winding door 260. Similarly, a connecting band is also disposed above the third winding door 40, and the connecting band is fixedly connected to the sunshade cloth 20, and a connecting band is also fixedly connected to the third winding door 40, so that after the third winding door 40 is wound, the two connecting bands are tied with each other, thereby fixing the third winding door 40. Specifically, the first winding door 240, the second winding door 260, and the third winding door 40 are all made of cloth.

Figure 3:
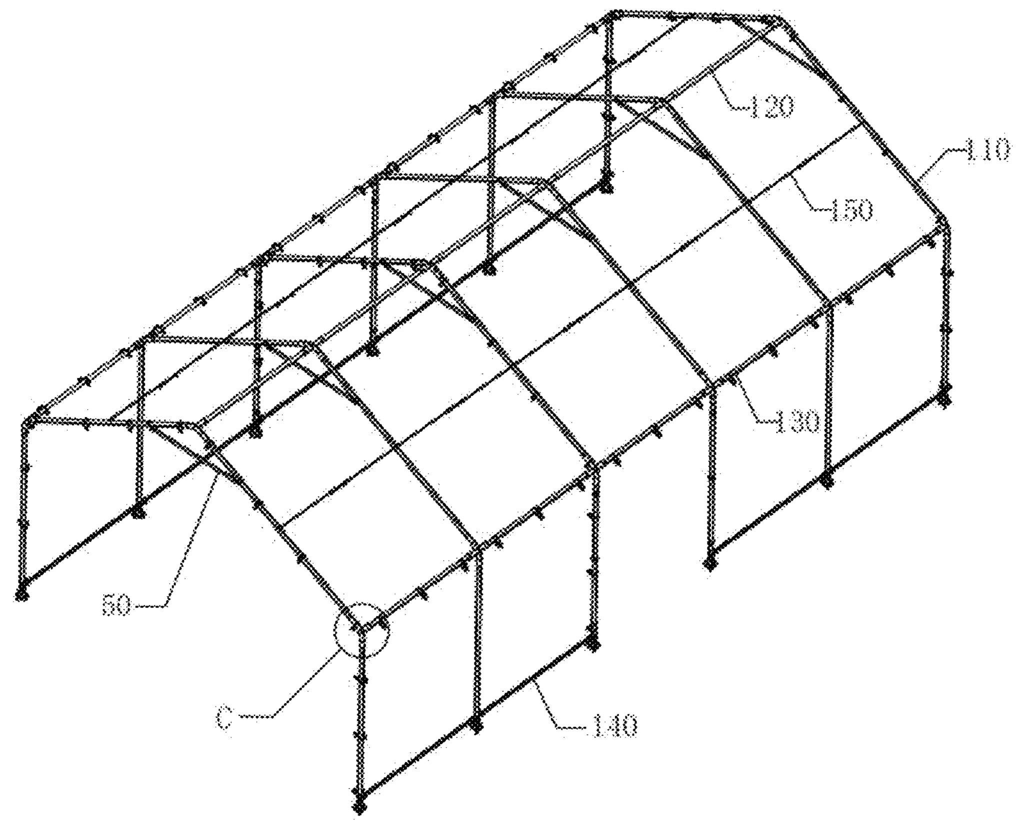
FIG. 3 is a schematic structural diagram of a bracket in an awning according to an embodiment of the present application.
Figure 8:
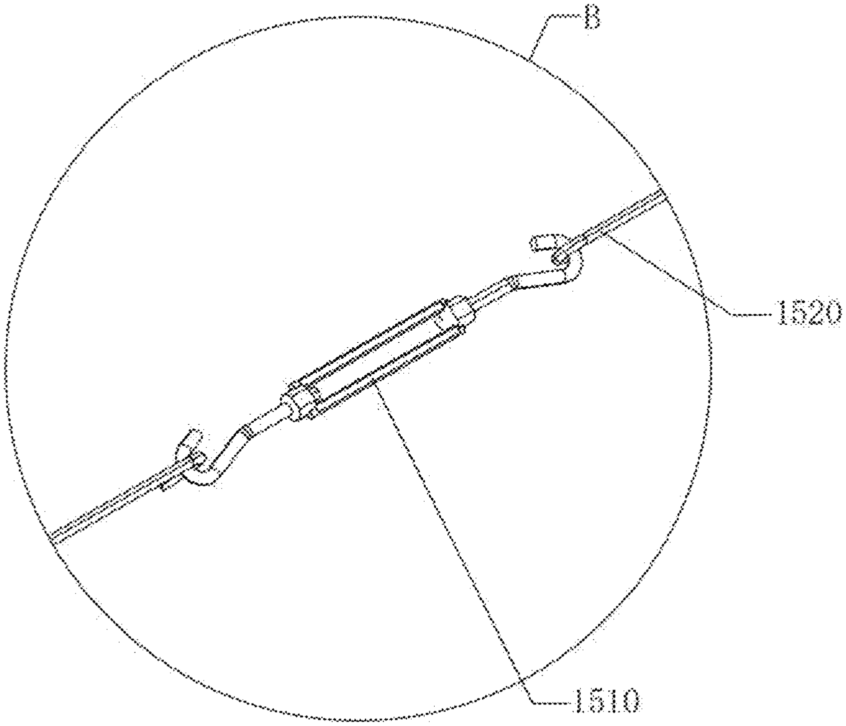
FIG. 8 is a partial enlarged view of a position B in FIG. 4.
Figure 9:
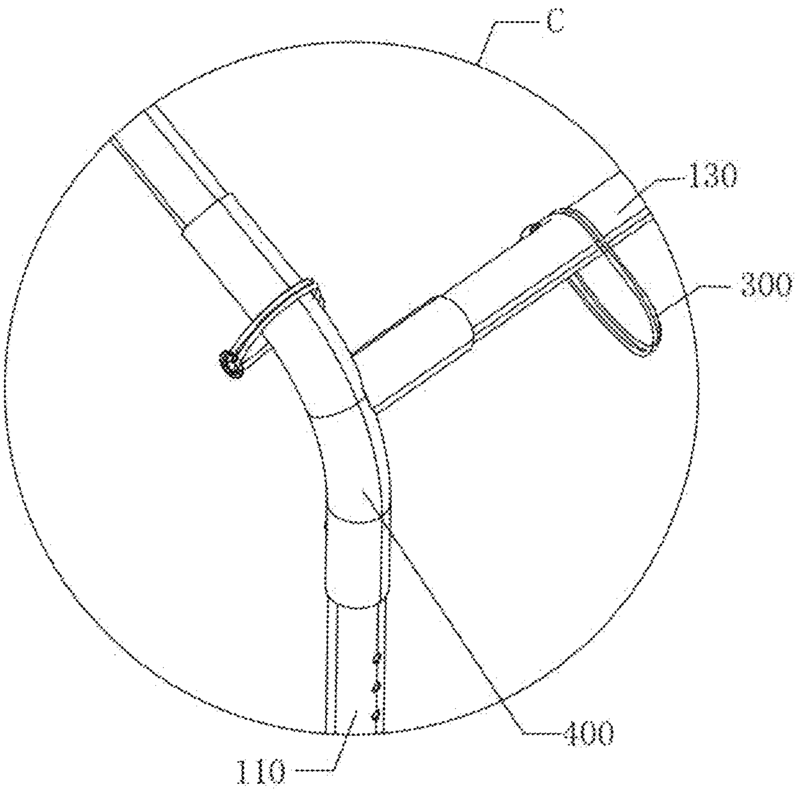
FIG. 9 is a partial enlarged view of a position C in FIG. 3.

Referring to FIG. 3 and FIG. 8, a same reinforcing rod 50 is connected between two oblique arms of the arch-shaped support frame 110, the iron cable 150 includes an adjustable pulling lock 1510, a rope 1520 is connected to each of two ends of the adjustable pulling lock 1510, and two ropes 1520 are connected to the two adjacent arch-shaped support frames 110. Specifically, the reinforcing rod 50 can strengthen structural strength of the arch-shaped support frame 110, thereby strengthening overall structural strength of the awning bracket 10. Further, the iron cable 150 is configured for top portion bearing, greatly improving a bearing capability of the awning. In addition, the adjustable pulling lock 1510 in the present application may be adjusted in a rotating adjustment manner or may be adjusted in a spring adjustment manner. It should be noted that, an adjustment manner of the pulling lock 1510 in the present application is not limited to the above two manners only, and may be another adjustment manner that can adjust a distance between the two ropes 1520.

Figure 4:
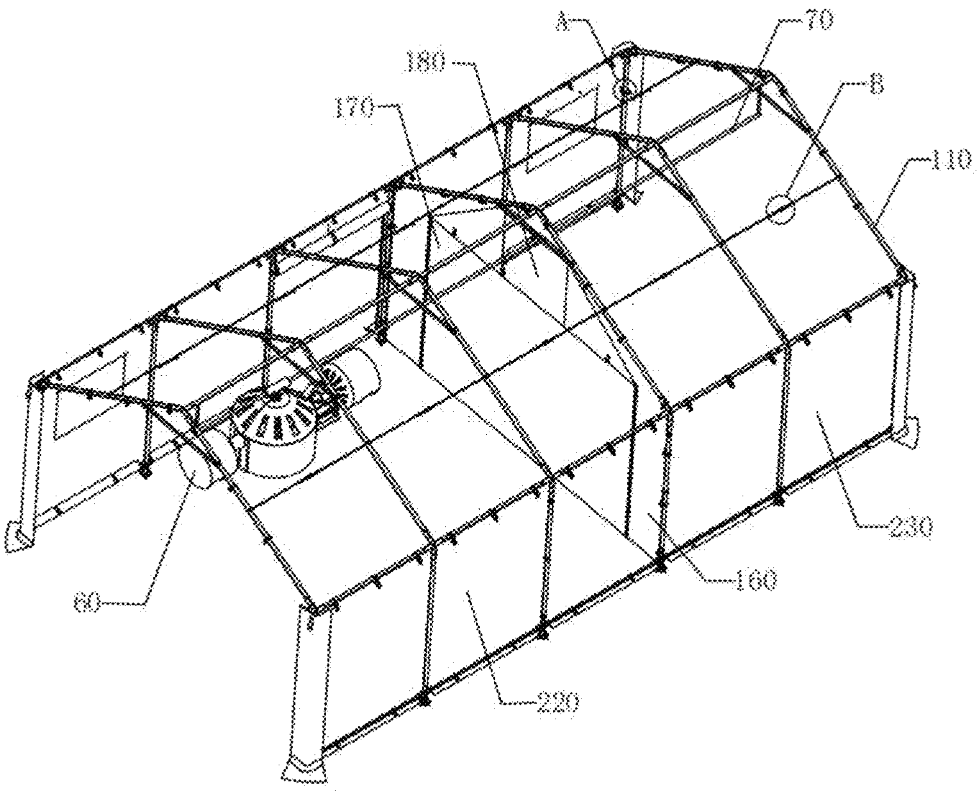
FIG. 4 is a schematic structural diagram of a bracket and a fan assembly in an awning according to an embodiment of the present application.

Referring to FIG. 4, a same U-shaped rod 70 is threadedly connected to bottom portions of two top rods 120, a fan assembly 60 is slidably sleeved on the U-shaped rod 70, and the fan assembly 60 is directly opposite to the penetration opening 180 and can pass through the penetration opening 180. During specific disposing, the fan assembly 60 can slide on the U-shaped rod 70, to adjust a position of an air blowing mechanism 80. In addition, the U-shaped rod 70 passes through the penetration opening 180, so that the fan assembly 60 can move in the first space 220 and the second space 230.

Figure 5:
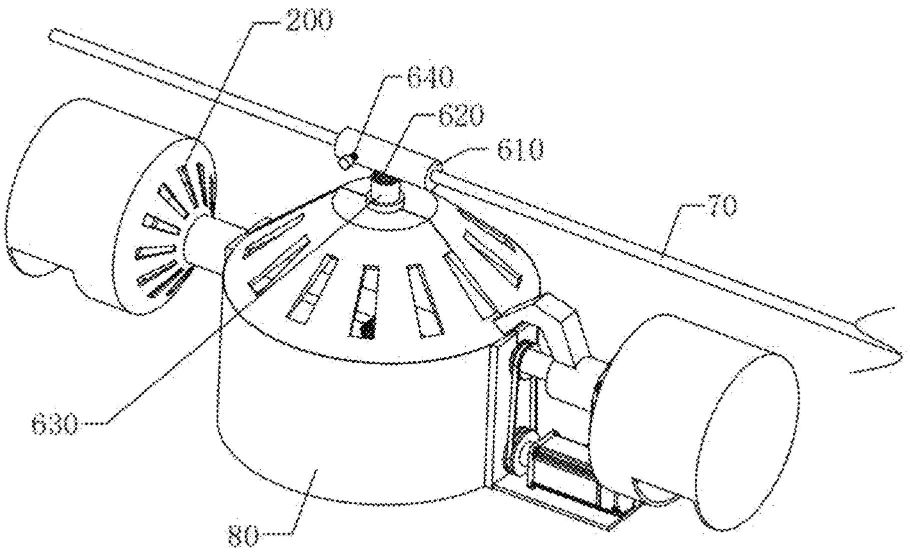
FIG. 5 is a schematic structural diagram of an air blowing mechanism in an awning according to an embodiment of the present application.
Figure 6:
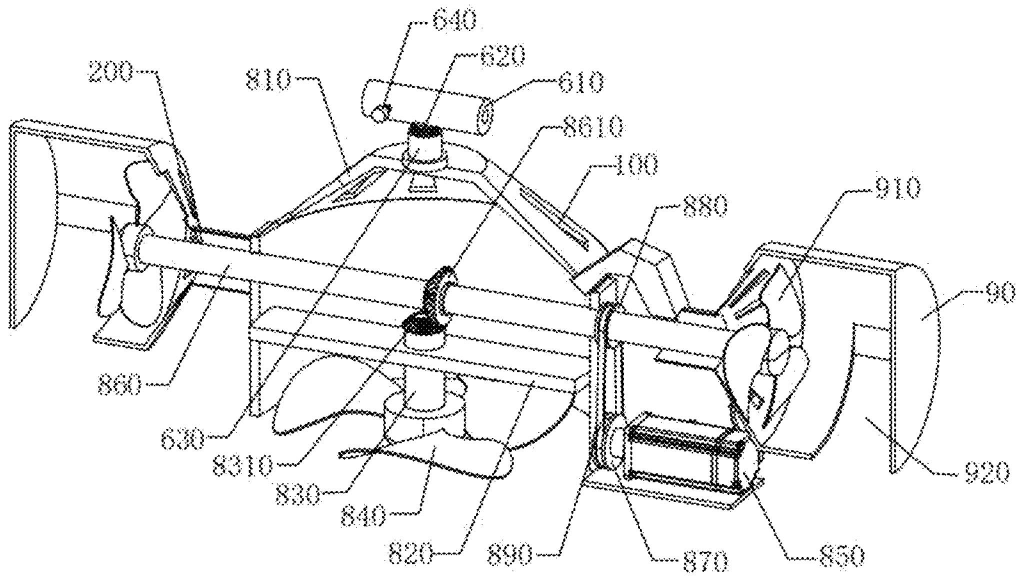
FIG. 6 is a schematic structural sectional view of an air blowing mechanism in an awning according to an embodiment of the present application.
Figure 7:
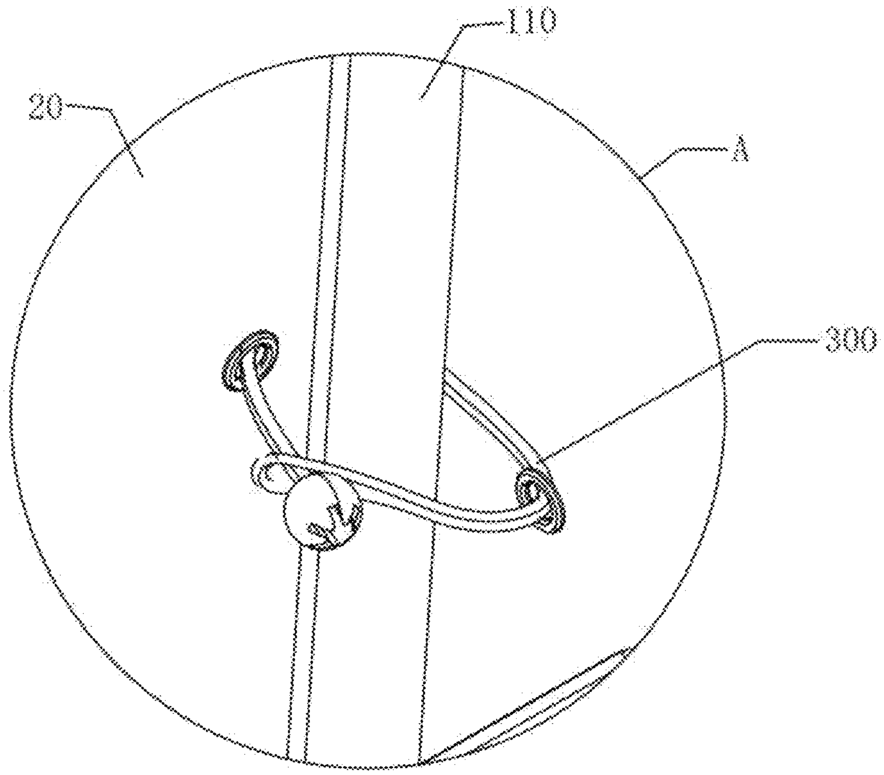
FIG. 7 is a partial enlarged view of a position A in FIG. 4.

Referring to FIG. 5 and FIG. 6, the fan assembly 60 includes a sleeve tube 610 slidably sleeved on the U-shaped rod 70, a screw rod 620 is fixedly connected to a bottom portion of the sleeve tube 610, a threaded tube 630 is threadedly sleeved on the screw rod 620, the air blowing mechanism 80 is fixedly connected to a bottom portion of the threaded tube 630, an abutting rod 640 further threadedly penetrates through the sleeve tube 610, and one end of the abutting rod 640 can abut against an outer wall of the U-shaped rod 70. During disposing, the threaded tube 630 can be removed from the screw rod 620, thereby facilitating disassembling and assembling the air blowing mechanism 80. Specifically, after the awning bracket 10 is set up, the air blowing mechanism 80 may be mounted on the U-shaped rod 70. Further, one end of the abutting rod 640 abuts against the outer wall of the U-shaped rod 70, so that the air blowing mechanism 80 may be fixed.

Referring to FIG. 5 and FIG. 6, the air blowing mechanism 80 includes a first cover body 810 fixedly connected to the bottom portion of the threaded tube 630, a fixing plate 820 is fixedly mounted on an inner wall of the first cover body 810, a first rotating shaft 830 rotatably penetrates through the fixing plate 820, a first fan blade 840 is fixedly mounted on a bottom portion of the first rotating shaft 830, a first bevel gear 8310 is fixedly mounted on a top portion of the first rotating shaft 830, and the first fan blade 840 is located in the first cover body 810. During working, the first rotating shaft 830 drives the first fan blade 840 to rotate in the first cover body 810, to implement that internal air of the first cover body 810 flows downward, thereby blowing air downward.

Referring to FIG. 6, the air blowing mechanism 80 further includes a motor 850 mounted on an outer wall of the first cover body 810 and a second rotating shaft 860 rotatably penetrating through the first cover body 810, a first belt pulley 870 is fixedly sleeved on a driving shaft of the motor 850, a second belt pulley 880 is fixedly sleeved on the second rotating shaft 860, a same transmission belt 890 is wound around the first belt pulley 870 and the second belt pulley 880, a second bevel gear 8610 is fixedly sleeved on the second rotating shaft 860, and the first bevel gear 8310 is engaged with the second bevel gear 8610. Further, the driving shaft of the motor 850 drives the first belt pulley 870 to rotate, and the first belt pulley 870 drives the second belt pulley 880 to rotate through the transmission belt 890, so that second belt pulley 880 drives the second rotating shaft 860 to rotate, to implement that the second rotating shaft 860 drives the first rotating shaft 830 to rotate through the second bevel gear 8610 and the first bevel gear 8310, thereby driving the first fan blade 840 to rotate.

Referring to FIG. 6, two second cover bodies 90 are fixedly connected to the outer wall of the first cover body 810, two ends of the second rotating shaft 860 respectively extend into the two second cover bodies 90, a second fan blade 910 is mounted at each of the two ends of the second rotating shaft, the second fan blade 910 is located in the second cover body 90, and each of bottom portions of the two second cover bodies 90 is provided with an air outlet 920. It should be noted that, when rotating, the second rotating shaft 860 drives second fan blades 910 at the two ends of the second rotating shaft to rotate, to implement air flow in the second cover bodies 90. Meanwhile, the bottom portion of the second cover body 90 is provided with the air outlet 920, to implement that internal air of the second cover body 90 flows downward, thereby improving an overall air flow rate.

Referring to FIG. 6, a top portion of the first cover body 810 is disposed in a tapered shape, a tapered surface of the first cover body is provided with a plurality of first air inlets 100, one end of the second cover body 90 is disposed in a tapered shape, and a tapered surface of the second cover body is provided with a plurality of second air inlets 200. Specifically, air can respectively enter the first cover body 810 and the second cover body 90 from the first air inlet 100 and the second air inlet 200.

Figure 10:
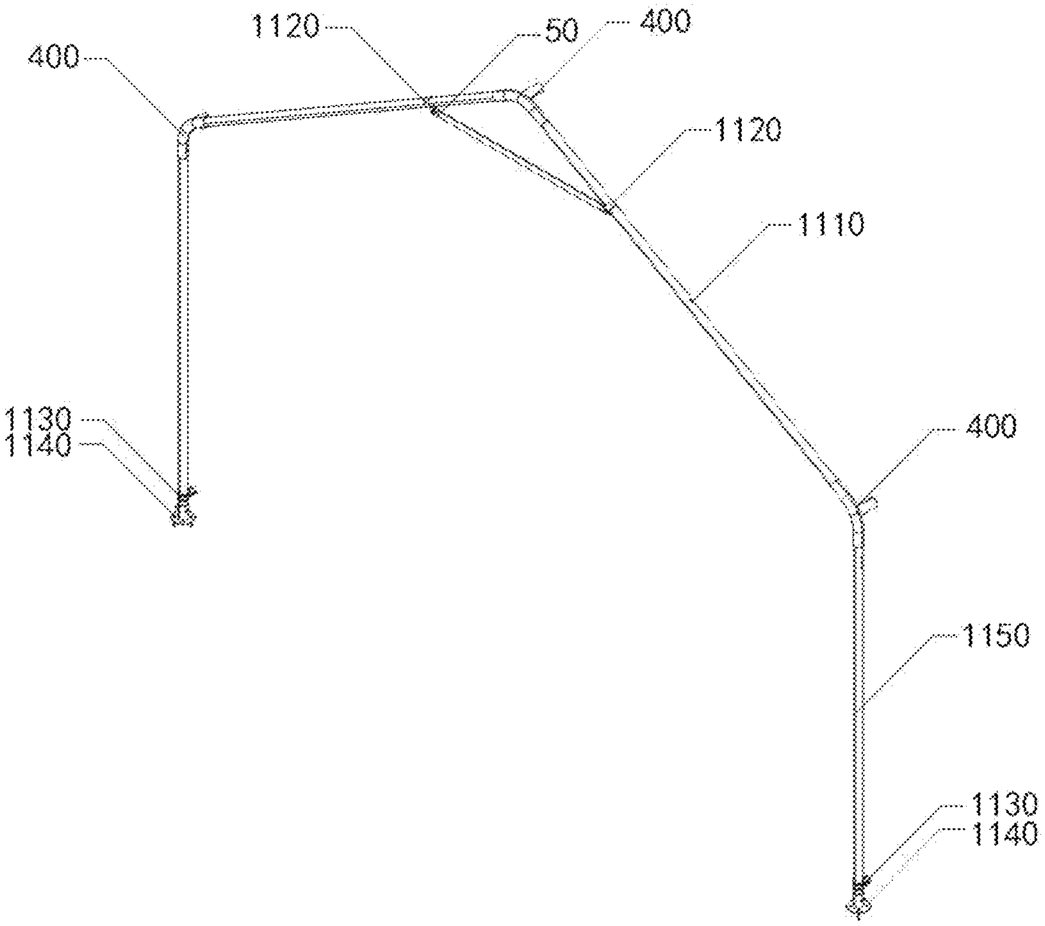
FIG. 10 is a schematic structural diagram of an arch-shaped support frame according to an embodiment of the present application.

Referring to FIG. 10, the arch-shaped support frame 110 includes a first support rod 1110, a sleeve ring 1120, a low rod connecting member 1130, a foot base 1140, and a second support rod 1150. Two second support rods 1150 that are vertically placed are disposed on a bottom portion of the arch-shaped support frame 110, two first support rods 1110 that are obliquely placed are disposed on a top portion thereof, and the second support rods and the first support rods are connected to each other through a three-way connecting member 400. Sleeve rings 1120 are sleeved on the obliquely-placed first support rods 1110 on the top portion of the arch-shaped support frame 110 and are configured to be fixedly connected to the reinforcing rod 50. Low rod connecting members 1130 are sleeved on the vertically-placed second support rods 1150 on the bottom portion of the arch-shaped support frame 110, and foot bases 1140 are fixedly connected to most bottom portions of the second support rods 1150. The low rod connecting member 1130 is configured to be fixedly connected to the low rod 140, and the foot base 1140 fixes the arch-shaped support frame 110 to the ground.

When the awning is used: first, the awning bracket 10 is assembled and placed on the ground; then, the sunshade cloth 20 is sleeved on the awning bracket 10, and the sunshade cloth 20 is fixed to the awning bracket 10 through the connecting rope 300; then, the U-shaped rod 70 is mounted on two arch-shaped support frames 110; and finally, the air blowing mechanism 80 is mounted, and the threaded tube 630 is threadedly connected to the screw rod 620 in a corresponding manner, so that the air blowing mechanism 80 is mounted on the U-shaped rod 70. The abutting rod 640 rotates to fix the sleeve tube 610 to the U-shaped rod 70, then the power supply is turned on, to enable the motor 850 to rotate, and the motor 850 drives the second rotating shaft 860 to rotate, to enable the second rotating shaft 860 to drive the first rotating shaft 830 to rotate, to implement that the first rotating shaft 830 drives the first fan blade 840 to rotate, thereby enabling internal air of the first cover body 810 to flow downward. At the same time, the second rotating shaft 860 drives the second fan blades 910 at the two ends of the second rotating shaft to rotate, to enable internal air of the second cover body 90 to flow downward.

It should be noted that a specific model specification of the motor 850 needs to be determined through model selection according to an actual specification and the like of the device, and a specific model selection calculation method adopts the prior art in the art. Therefore, details are not described in detail again.

The power supply and principle of the motor 850 are clear to a person skilled in the art, and are not described in detail herein.

The foregoing descriptions are merely the embodiments of the present application, and are not intended to limit the scope of protection of the present application. For a person skilled in the art, the present application may have various modifications and variations. Any modification, equivalent replacement, or improvement made without departing from the spirit and principle of the present application shall fall within the scope of protection of the present application. It should be noted that similar reference numerals and letters refer to similar items in the following accompanying drawings, and therefore, once an item is defined in one accompanying drawing, it is not necessary to further define and explain the item in the subsequent accompanying drawings.

What is claimed is:

1. A storage awning, comprising:

an awning bracket (10), wherein the awning bracket (10) comprises a plurality of arch-shaped support frames (110);

a top rod (120), a side support rod (130), and a low rod (140) connected between each two adjacent arch-shaped support frames (110);

an iron cable (150) connected between oblique arms of adjacent arch-shaped support frames (110);

a partitioning band (160) connected to an inner wall of one of the arch-shaped support frames (110); and a sunshade cloth (20), wherein the sunshade cloth (20) is sleeved on the plurality of arch-shaped support frames (110), each of left and side walls of the sunshade cloth is provided with an entrance-exit opening (210), the partitioning band (160) internally partitions the sunshade cloth (20) into a first space (220) and a second space (230), the partitioning band is provided with a door body (170), the partitioning band (160) is further provided with a penetration opening (180), and a reflective strip (270) is mounted on each of side walls of two left and right sides of the sunshade cloth (20).

2. The storage awning according to claim 1, wherein a first winding door (240) is fixedly connected to each of the left and right side walls of the sunshade cloth (20), two first winding doors (240) are respectively located above two entrance-exit openings (210), each of front and rear surfaces of the first space (220) and the second space (230) is provided with a window (250), and a second winding door (260) is mounted on each of a plurality of windows (250).

3. The storage awning according to claim 1, wherein a back surface of the sunshade cloth (20) is provided with a side opening (30), a third winding door (40) is mounted on the back surface of the sunshade cloth, and the third winding door (40) is located above the side opening (30).

4. The storage awning according to claim 1, wherein a reinforcing rod (50) is connected between two oblique arms of each respective arch-shaped support frame (110), the iron cable (150) comprises an adjustable pulling lock (1510), a rope (1520) is connected to each of two ends of the adjustable pulling lock (1510), and two ropes (1520) are connected to the two adjacent arch-shaped support frames (110).

5. The storage awning according to claim 1, wherein a same U-shaped rod (70) is threadedly connected to bottom portions of two top rods (120), a fan assembly (60) is slidably sleeved on the U-shaped rod (70), and the fan assembly (60) is directly opposite to the penetration opening (180) and can pass through the penetration opening (180).

6. The storage awning according to claim 5, wherein the fan assembly (60) comprises a sleeve tube (610) slidably sleeved on the U-shaped rod (70), a screw rod (620) is fixedly connected to a bottom portion of the sleeve tube (610), a threaded tube (630) is threadedly sleeved on the screw rod (620), an air blowing mechanism (80) is fixedly connected to a bottom portion of the threaded tube (630), an abutting rod (640) further threadedly penetrates through the sleeve tube (610), and one end of the abutting rod (640) can abut against an outer wall of the U-shaped rod (70).

7. The storage awning according to claim 6, wherein the air blowing mechanism (80) comprises a first cover body (810) fixedly connected to the bottom portion of the threaded tube (630), a fixing plate (820) is fixedly mounted on an inner wall of the first cover body (810), a first rotating shaft (830) rotatably penetrates through the fixing plate (820), a first fan blade (840) is fixedly mounted on a bottom portion of the first rotating shaft (830), a first bevel gear (8310) is fixedly mounted on a top portion of the first rotating shaft (830), and the first fan blade (840) is located in the first cover body (810).

8. The storage awning according to claim 7, wherein the air blowing mechanism (80) further comprises a motor (850)

mounted on an outer wall of the first cover body (810) and a second rotating shaft (860) rotatably penetrating through the first cover body (810), a first belt pulley (870) is fixedly sleeved on a driving shaft of the motor (850), a second belt pulley (880) is fixedly sleeved on the second rotating shaft (860), a same transmission belt (890) is wound around the first belt pulley (870) and the second belt pulley (880), a second bevel gear (8610) is fixedly sleeved on the second rotating shaft (860), and the first bevel gear (8310) is engaged with the second bevel gear (8610).

9. The storage awning according to claim 8, wherein two second cover bodies (90) are fixedly connected to the outer wall of the first cover body (810), two ends of the second rotating shaft (860) respectively extend into the two second cover bodies (90), a second fan blade (910) is mounted at each of the two ends of the second rotating shaft, the second fan blade (910) is located in the second cover body (90), and each of bottom portions of the two second cover bodies (90) is provided with an air outlet (920).

10. The storage awning according to claim 9, wherein a top portion of the first cover body (810) is disposed in a tapered shape, a tapered surface of the first cover body is provided with a plurality of first air inlets (100), one end of the second cover body (90) is disposed in a tapered shape, and a tapered surface of the second cover body is provided with a plurality of second air inlets (200).

* * * * *